Figure 1:
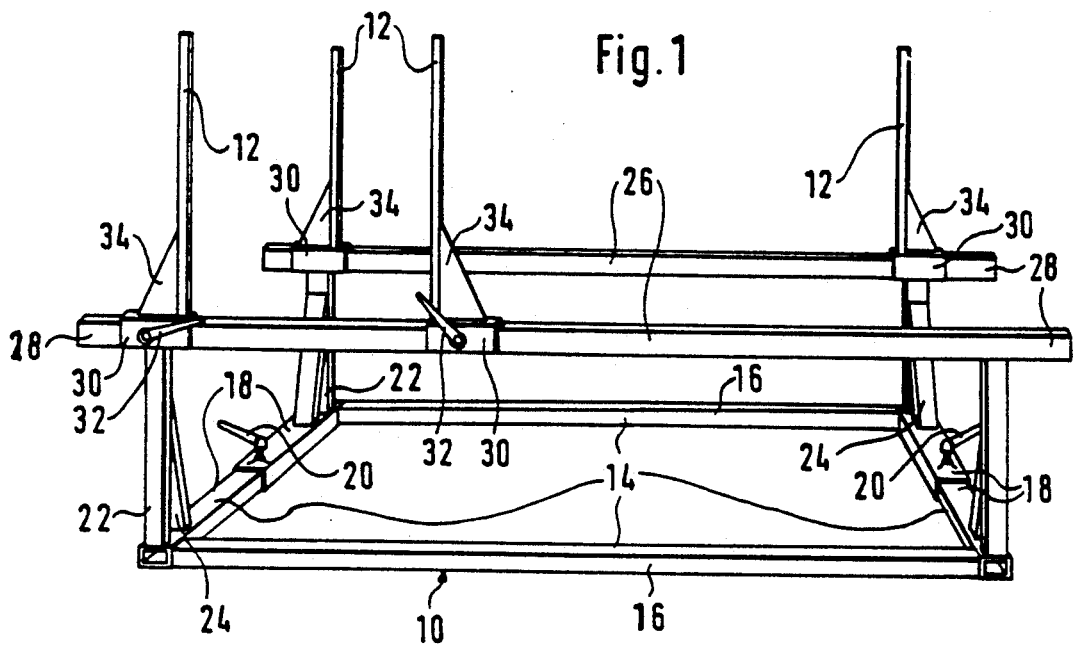

United States Patent [19]

Schmidmeister

[11] Patent Number: 5,265,722

[45] Date of Patent: Nov. 30, 1993

[54] STORAGE AND TRANSPORT DEVICE FOR PLATES

[76] Inventor: Gerhard Schmidmeister, Bernsteinstr. 161, W-7000 Stuttgart 75, Fed. Rep. of Germany

[21] Appl. No.: 993,808

[22] PCT Filed: Feb. 2, 1990

[86] PCT No.: PCT/EP90/00184

§ 371 Date: Sep. 25, 1991

§ 102(e) Date: Sep. 25, 1991

[87] PCT Pub. No.: WO90/11238

PCT Pub. Date: Oct. 4, 1990

Related U.S. Application Data

[63] Continuation of Ser. No. 761,978, Sep. 25, 1991, abandoned.

[30] Foreign Application Priority Data

Mar. 28, 1989 [DE] Fed. Rep. of Germany ... 8903789[U]

[51] Int. Cl.⁵ .................. B65D 85/00; B65D 85/48
[52] U.S. Cl. ...................... 206/321; 206/449
[58] Field of Search ............. 206/321, 325, 449, 448, 206/451, 452

[56] References Cited

U.S. PATENT DOCUMENTS

| | | |
|---|---|---|
| 3,147,860 | 9/1964 | Kean, Sr. et al. |
| 3,533,502 | 10/1970 | Hansen |
| 3,746,176 | 7/1973 | Kotlar ............... 206/448 |
| 3,809,234 | 5/1974 | Kurick ............... 206/451 |
| 3,927,764 | 12/1975 | Fox ................... 206/451 |
| 4,445,616 | 5/1984 | Mancusi |

FOREIGN PATENT DOCUMENTS

| | | |
|---|---|---|
| 1924788 | 9/1965 | Fed. Rep. of Germany |
| 2234949 | 7/1972 | Fed. Rep. of Germany |
| 2261630 | 12/1972 | Fed. Rep. of Germany |
| 2658142 | 12/1976 | Fed. Rep. of Germany |
| 2659155 | 12/1976 | Fed. Rep. of Germany |
| 2702408 | 1/1977 | Fed. Rep. of Germany |
| 2706994 | 2/1977 | Fed. Rep. of Germany |
| 8900327 | 1/1989 | Fed. Rep. of Germany |
| 451598 | 12/1974 | U.S.S.R. .............. 206/449 |

OTHER PUBLICATIONS

German Search Report dated Sep. 27, 1989.
International Search Report dated Jun. 8, 1990.
Notification of International Preliminary Examination Report dated Sep. 27, 1991.

*Primary Examiner*—William I. Price
*Attorney, Agent, or Firm*—Wigman, Cohen, Leitner & Myers

[57] ABSTRACT

A device for storing and transporting painted plates, e.g. doors, by means of individual frames known as "door bearers" is described. The invention provides a transport device using one handler only while preventing damage to the transported plates comprising a tubular chassis (10) with rectangular basic frames (14) which may be telescopic in two mutually perpendicular horizontal directions, the corners of which are fitted with vertical posts (22) each pair of which bears possibly telescopic cross-members (26) parallel to transverse shanks (16) on which sit two vertical bars (12) to clamp a horizontal stack of vertically upright frames (36).

5 Claims, 2 Drawing Sheets

STORAGE AND TRANSPORT DEVICE FOR PLATES

This is a continuation of co-pending application Ser. No. 07/761,978 filed on Sep. 25, 1991 and now abandoned.

DESCRIPTION

This invention relates to a device for storing and transporting a plurality of painted doors or other plates, comprising substantially rectangular frames which are to be arranged in such a manner on the possibly beaded end faces of the plates that their longer midlines cover the longitudinal lines of the end faces and which are to be releasably attached to the end faces by means of screws or the like.

The only known device of this type on the whole comprises only the frames known as "door bearers" which are placed with their longer midline horizontally one above the other, not only for storing the painted doors but also for their transport, while the plates are placed horizontally. In this arrangement, neither of the two stacks of frames has any frame connections within itself, with the result that the frames are liable to slip out of place in relation to one another both transversely to the direction of travel when the vehicle transporting them is negotiating a curve and in the direction of transport during braking or acceleration of the vehicle, and these movements could only be completely prevented by holding the plates on all sides. This problem is dealt with by employing a person to accompany the transport, whose sole task is to prevent the vertically stacked horizontally placed plates from shifting out of the stack.

The known device therefore has the disadvantage that one must either accept the risk of the stack of plates slipping out of position, which may, for example, result in damage to the paintwork on the plates, or engage at least two handlers.

It is therefore an object of the present invention to provide a device for the storage and transport of a plurality of plates, in particular of painted doors, which avoids this disadvantage and requires only one handler and yet ensures that the transported plates will arrive undamaged at their destination.

This problem is solved according to the invention in a device of the type described above by a tubular chassis comprising a plane rectangular basic frame composed of two pairs of parallel, optionally telescopic shanks; a supported post at each corner of the basic frame; and two parallel, optionally telescopic cross-members mounted on the upper ends of the posts, above the parallel transverse shanks of the basic frame, which shanks connect the longitudinal shanks; and by two vertical bars mounted on each cross-member to be displaceable and fixed thereon for clamping a horizontal row of frames which are attached to the plates and are placed upright on the cross-member.

The basic frame thus constructed provides the advantage that all the plates are now force-locked together by way of the frames which are screwed to the plates and clamped together on the tubular chassis by means of the bars, so that the stack of plates will always hold together even during transport.

In a preferred embodiment of the device according to the invention, the cross-members are longer than the transverse shanks of the basic frame and have free ends which may be arranged, for example, over wheel cases between which there is just sufficient room for the basic frame. Efficient use of space for the transport of the greatest possible number of plates can thus be achieved even if the space underneath the cross-members is restricted laterally.

In a further development of the preferred embodiment, in which not only the longitudinal shanks of the basic frame but also its transverse shanks and accordingly also the cross-members are telescopic, so that the basic surface of the device can be adapted to the space available on the floor of the transporting vehicle and the whole device together with the transported doors can thereby be prevented from slipping out of place, the transverse shanks and the cross-members consist each of two tubes, a first and a second of identical profile, and of a third tube of similar profile inserted in the aforesaid first and second tubes and arranged to be fixed in the first tube and longitudinally displaceable in the second tube; in addition, a fourth tube of identical profile, adapted in its length to the selected clear distance between the first and second tube, may be arranged on the third tube between the first and second tube to prevent a step at the transition between the third and first or third and second tube which could interfere with the smooth displacement of the bars. When the length of the cross-members is altered for adjusting the width of the device, the fourth tube is simply shortened or replaced by a longer piece.

Figure 2:
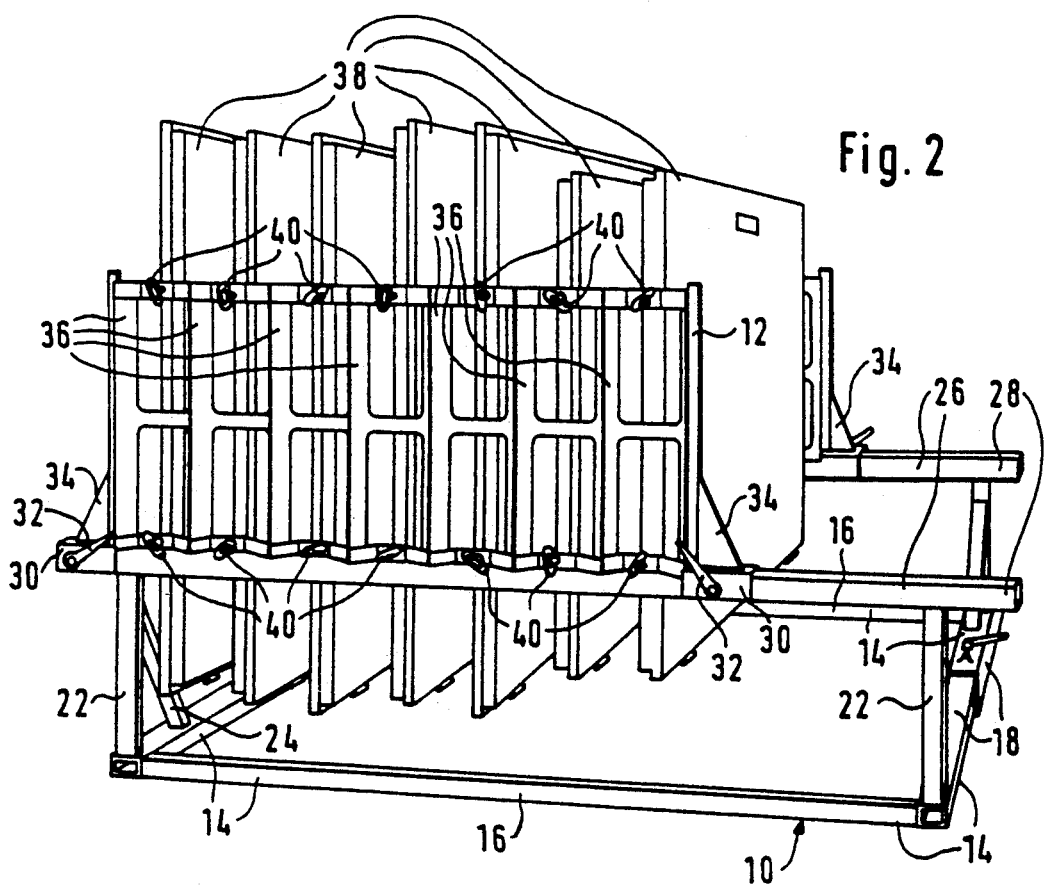
Figure 3:
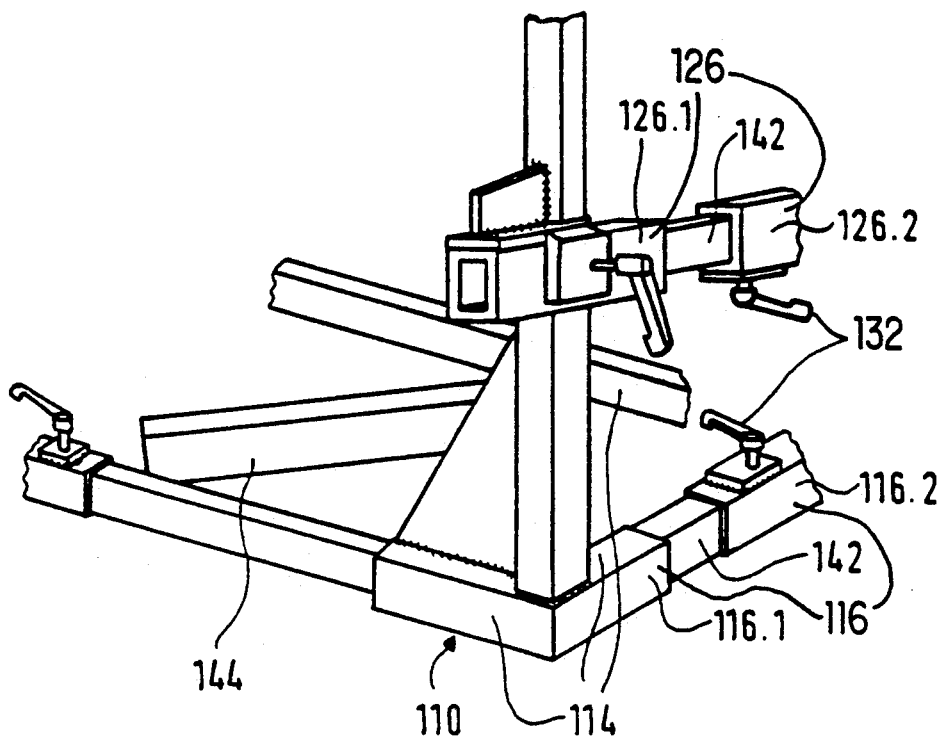

The invention is described in detail below with reference to the preferred embodiment of the device according to the invention and its further development illustrated by way of example in the drawing, in which FIG. 1 shows the embodiment without doors viewed in perspective from the rear to the centre, FIG. 2 gives a perspective view from the rear to the right hand side of the embodiment with the doors in place, FIG. 3 is a cut out view in perspective of the further development of the embodiment of FIG. 1.

Figure 4:
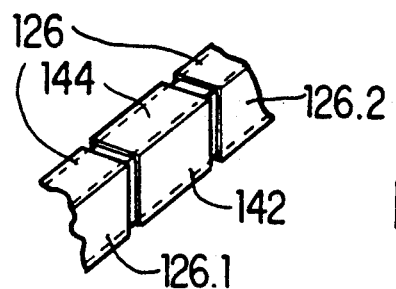

FIG. 4 is a detail view of connecting members and connecting pieces.

In the exemplary embodiment, the device according to the invention for the storage and transport of a plurality of painted doors or other plates consists mainly of a predominantly rectangular chassis 10 and two times two bars 12.

The chassis 10 is formed by rectangular tubes and comprises a plane, rectangular basic frame 14 composed of two U-shaped halves inserted one into the other and having two continuous, parallel transverse shanks 16 and two subdivided parallel longitudinal shanks 18 which are telescopic and the length of which can be adjusted in each case by tightening a screw provided with a hand lever 20. The size of the chassis is thereby adjustable to the height of the upright doors or, in other words, to the length of the reclining doors placed edgeways.

Posts 22 of the chassis 10 are placed at the four corners formed by the shanks of the basic frame 14. Each of these posts is rigidly connected to one part of the longitudinal shanks 18 by means of an oblique support 24 of the chassis.

A cross-member 26 is mounted on each half of the basic frame 14, at the upper ends of the two associated posts 22, above the transverse shank 16 carrying said posts and parallel to said shank. This cross-member is longer than the transverse shank 16, so that it projects with its two free ends 28 beyond the basic frame 14. The two cross-members 26 are also rectangular tubes.

Two slides 30 which are U-shaped in section sit astride each cross member 26, each of which slides can be fixed in position by means of a screw with hand lever 32 and each of which carries one of the two bars 12 which are supported each by an upright triangular member 34. The two triangular members 34 of the two slides 30 on each cross-member 26 are situated outside the space which is to be kept free between the two bars 12.

Since the width of each cross-member 26 measured horizontally, transversely to its longitudinal direction, is somewhat greater than the width, measured in the same direction, of the posts 22 carrying said cross member, the two slides 30 can be pushed each over one of the two free ends 28 of the cross-member so that the perpendicular distance between the two bars 12 is then equal to the length of the associated transverse shank 16 underneath the cross-member 26, and the section of cross-member thereof situated between the two posts 22 can be fully utilised for accomodating so called door bearers.

These door bearers 36 are substantially rectangular frames which are so arranged at the beaded end faces of the painted doors 38 (plates) which are to be stored and in particular to be transported that their longer midlines cover the longitudinal lines of the end faces. The door bearers 36 are releasably attached to the end faces of the doors 38 by means of handy screws 40.

The doors 38 which are to be stored in the chassis 10 and transported with the latter are placed in the up-ended position, with their longer end face carrying the hinge parts lying at the bottom, by placing the two door bearers 36 on each door upright on one of the two cross-members 26. The door bearers 36 are placed close together on each cross-member 26, whereupon they are clamped together as one unit by means of the two bars 12 which are moved up close to them, so that the door bearers cannot move in the longitudinal direction of the cross-member. Since the doors 38 extend from above into the space between the two cross members 26 on and in the basic frame 14 in such a manner that their vertically extending end faces almost abut against the cross members, the doors are also unable to move in the longitudinal direction of the longitudinal shanks 18 of the basic frame.

In a transport vehicle having a storage surface on which to place the basic frame 14, with two wheel cases rising upwards from said surface at the back of the sides, as is the case in delivery trucks, the chassis 10 is placed on the said storage surface in such a manner that two ends 28 of the cross-members lie above the wheel cases while the posts 22 are situated between and close to the wheel cases.

The further development of the embodiment initially described differs from the latter, as shown in FIG. 3, in that the transverse shanks 116 of the basic frame 114, which are in this case telescopic, and the cross-members 126 mounted in parallel above them, which are also telescopic, are interrupted in the left half of the chassis 110 along equal medium lengths which are bridged over in each case by a connecting member 142 of the chassis 110. Each connecting member 142 is fixed at one of its ends in the shorter section 116.1 or 126.1 of the transverse shank 116 or cross-member 126 and is longitudinally displaceable at its other end in the longer section 116.2 or 126.2 of the transverse shank 116 or cross-member 126. To make the narrower connecting member 142 flush with the wider, similarly profiled sections of the transverse shank 116 or of the cross-member 126, a short connecting piece 144 is provided to be mounted on the connecting member 142 between these sections to fill the gap.

FIG. 3 shows a screw with a hand lever 132, similar to hand lever 32 of FIGS. 1 and 2, provided in longer sections 116.2, 126.2 for fixing connecting member 142 therein. FIG. 4 shows a detail of FIG. 3 illustrating the mounting of piece 144 on member 142 between sections 126.1 and 126.2 of cross-member 126.

I claim:

1. A device for storing and transporting a plurality of upright rectangular plates, characterized by a tubular chassis comprising a plane rectangular basic frame comprising two parallel longitudinal shanks and two parallel transverse shanks; further comprising a supported post at each corner of said basic frame; and comprising two parallel cross-members mounted at the upper ends of said posts above said transverse shanks; and further characterized by two pairs of vertical bars, each bar of each of said paris being mounted on a slide displaceable on one of said cross-members and provided with means for fixing the position of said slide and of the vertical bar mounted thereon with respect to said one cross-member.

2. Device according to claim 1, characterised in that the cross-members are longer than the transverse shanks of the basic frame and have free ends.

3. Device according to claim 1, in which the transverse shanks and the cross-members are telescopic, characterized in that the transverse shanks and the cross-members are each comprised of two tubes, a first and second, of identical profile and of a third tube of similar profile inserted in the aforesaid tubes, which third tube is fixed in the first tube and arranged to be longitudinally displaceable in the second tube; and in that a fourth tube of identical profile adapted in length to the selected clear distance between the first and the second tube is to be arranged on the third tube, between the first and the second tube.

4. Device according to claim 2, in which the transverse shanks and the cross-members are telescopic, characterized in that the transverse shanks and the cross-members are each comprised of two tubes, a first and second, of identical profile and of a third of similar profile inserted in the aforesaid tubes, which third tube is fixed in the first tube and arranged to be longitudinally displaceable in the second tube; and in that a fourth tube of identical profile adapted in length to the selected clear distance between the first and the second tube is to be arranged on the third tube, between the first and the second tube.

5. Device according to claim 3, wherein the second tube is provided with a screw with a hand lever fixing in position the third tube in said second tube.

* * * * *